A. NOVICK.
ENVELOP MACHINE.
APPLICATION FILED JAN. 23, 1911.

1,089,786.

Patented Oct. 1, 1912.
8 SHEETS—SHEET 1.

WITNESSES:

INVENTOR
Abraham Novick
BY
George Finkelstein
ATTORNEY

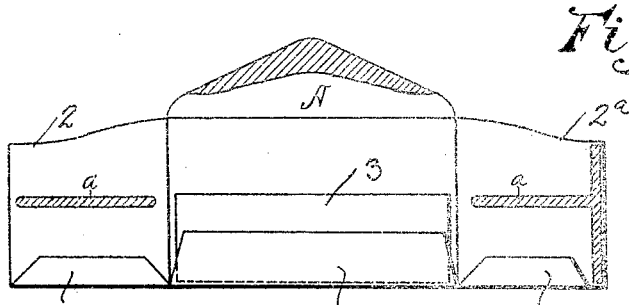
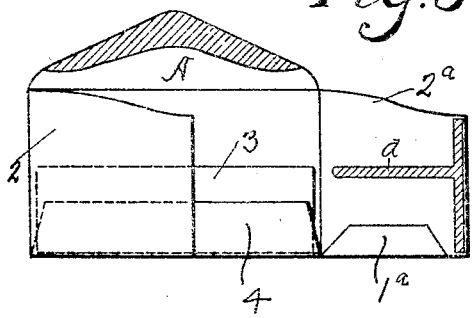
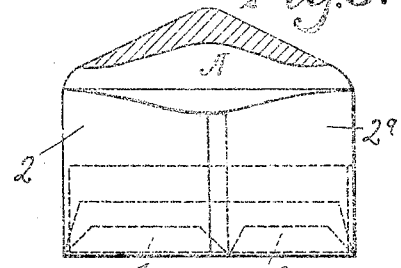
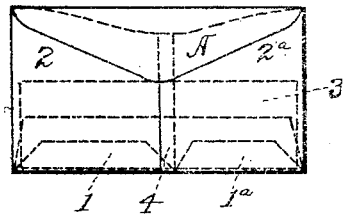
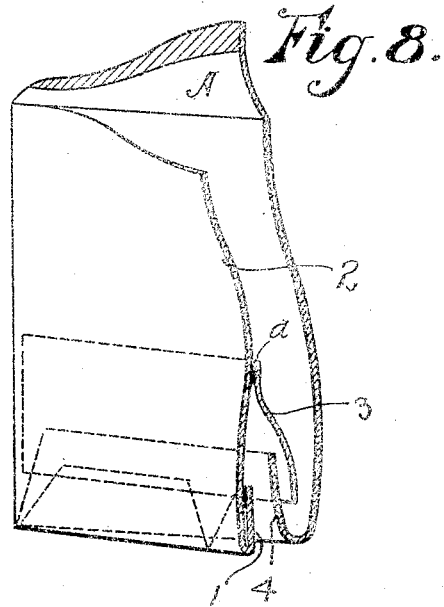

A. NOVICK.
ENVELOP MACHINE.
APPLICATION FILED JAN. 23, 1911.

1,039,786.

Patented Oct. 1, 1912
8 SHEETS—SHEET 3.

WITNESSES:
Frances Siegel
Joseph Sanders

INVENTOR
Abraham Novick
BY
George Finkelstein
ATTORNEY

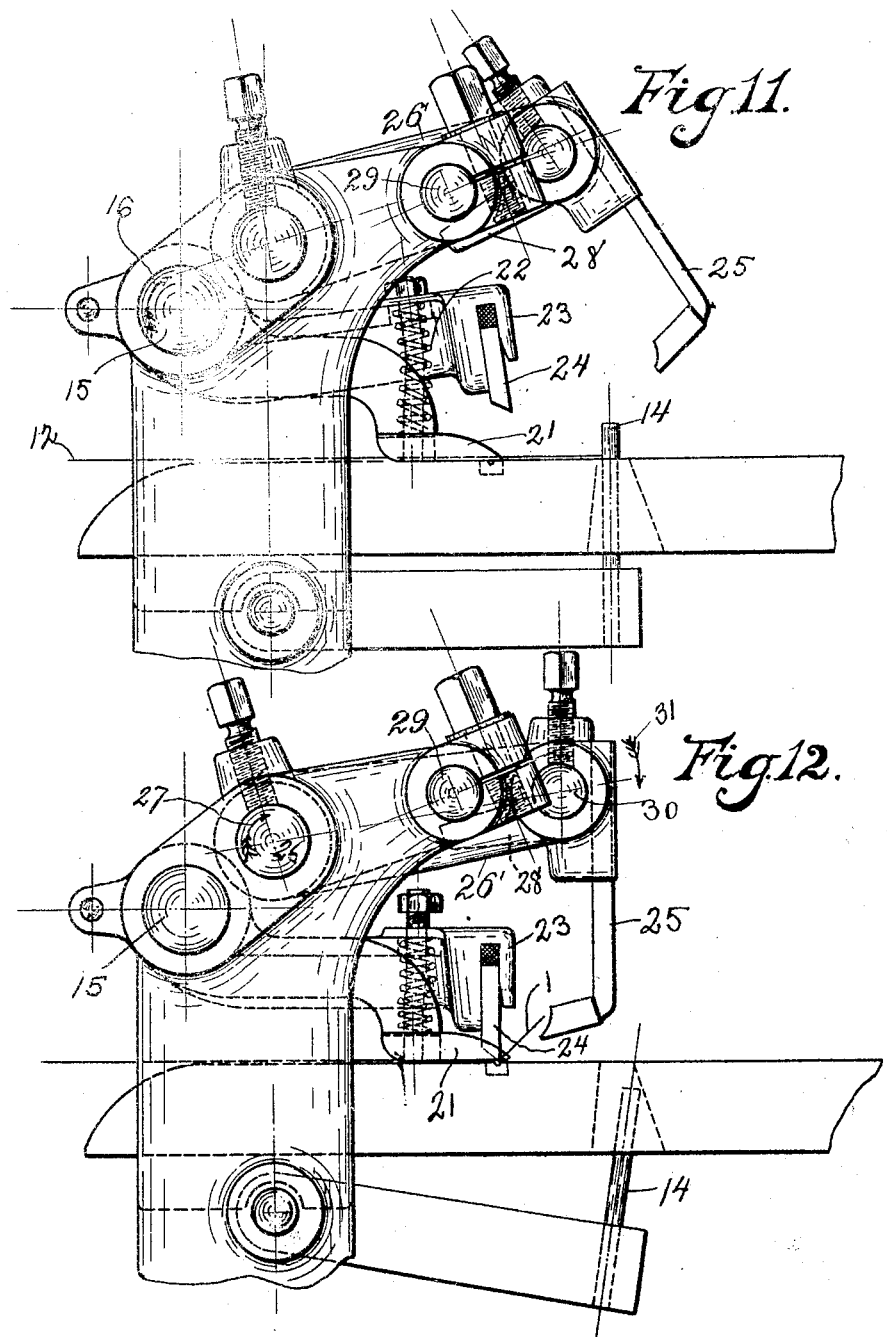

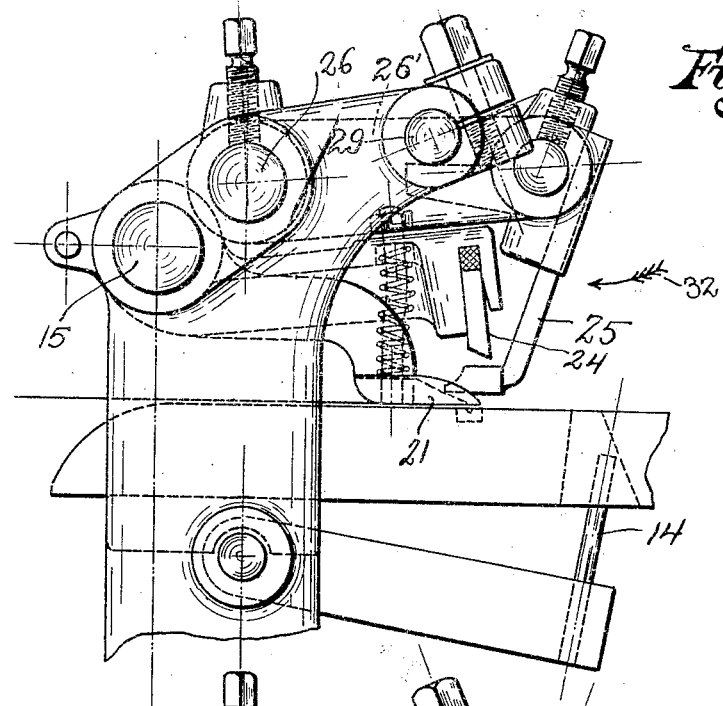
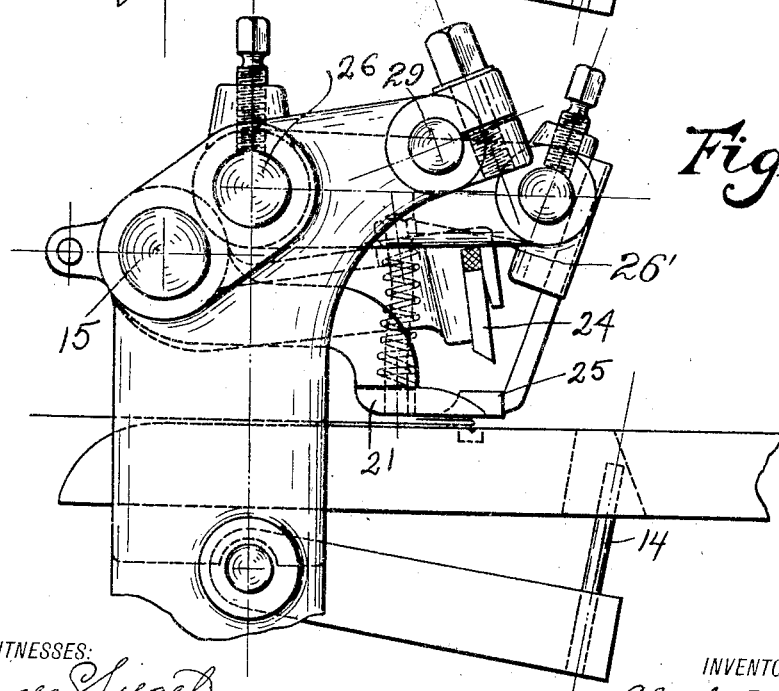

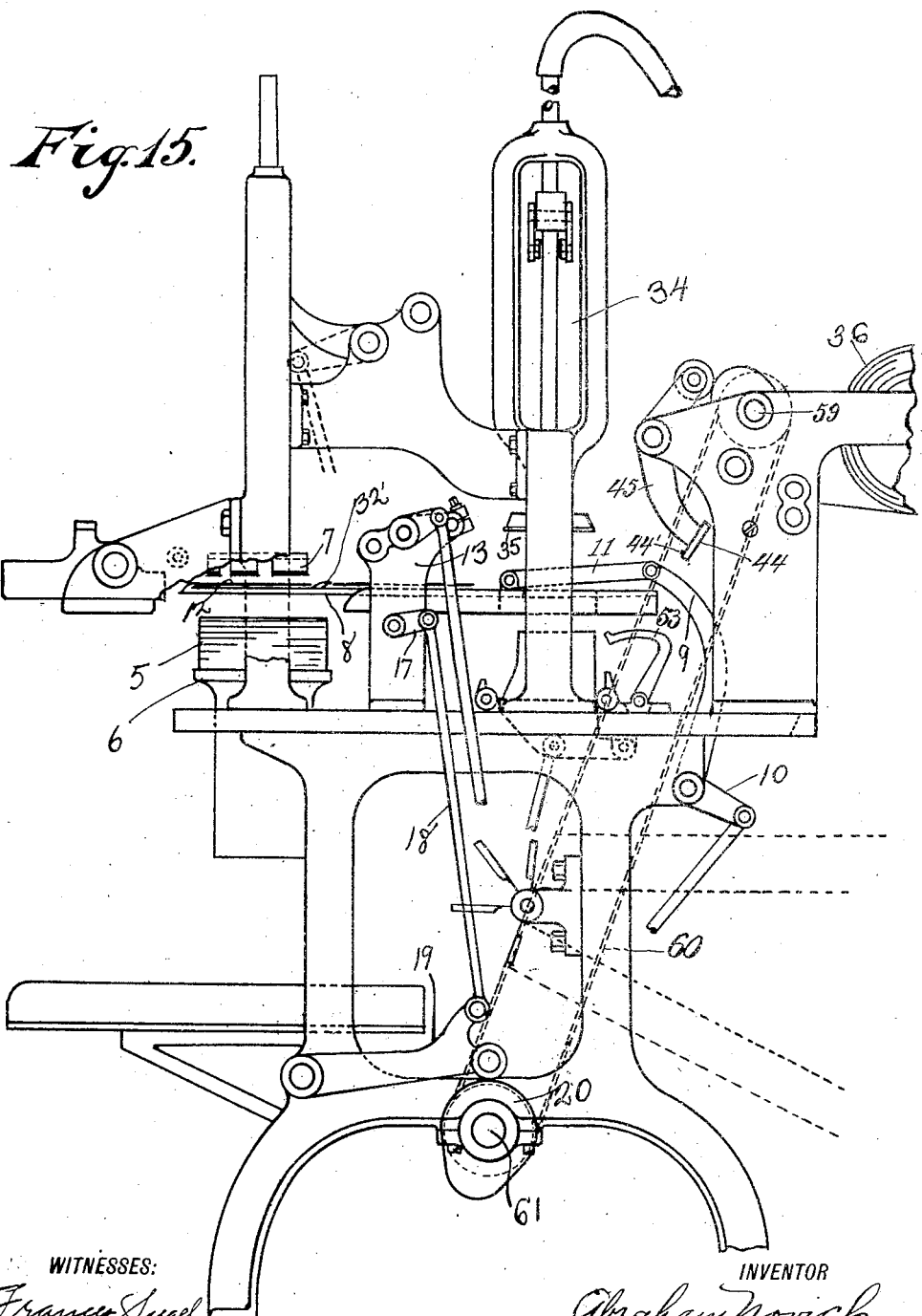

A. NOVICK.
ENVELOP MACHINE.
APPLICATION FILED JAN. 23, 1911.
1,039,786.
Patented Oct. 1, 1912.
8 SHEETS—SHEET 7.
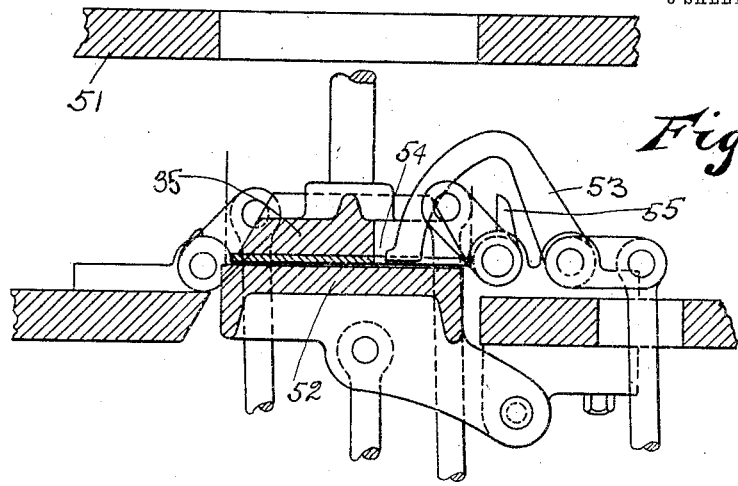
Fig. 16.
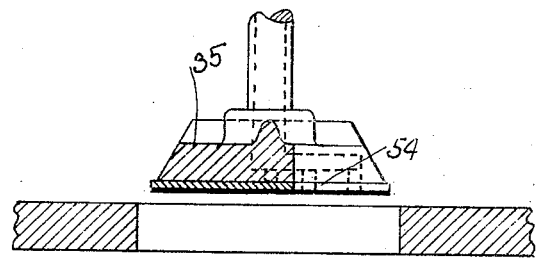
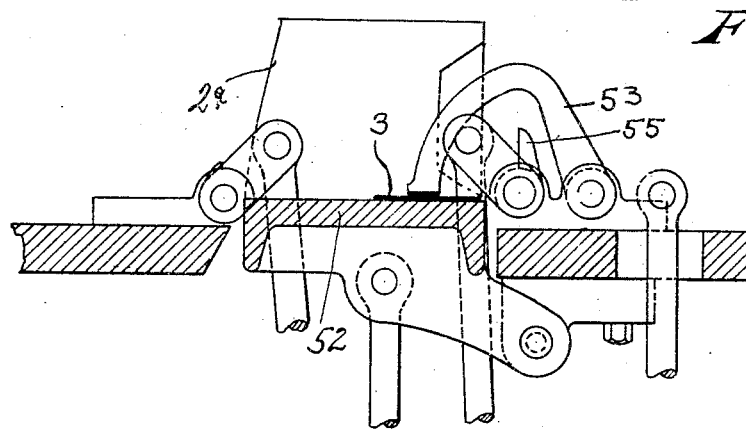
Fig. 17.
WITNESSES:
INVENTOR
Abraham Novick
BY
George Finkelstein
ATTORNEY

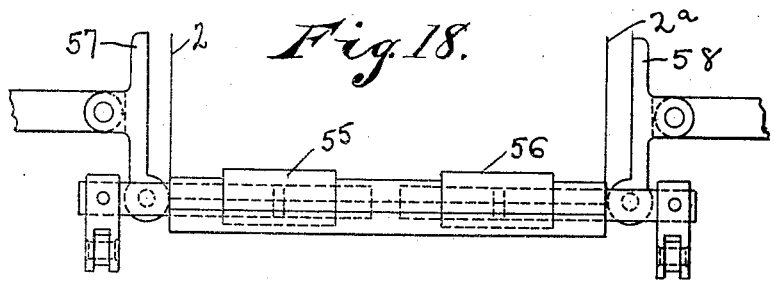
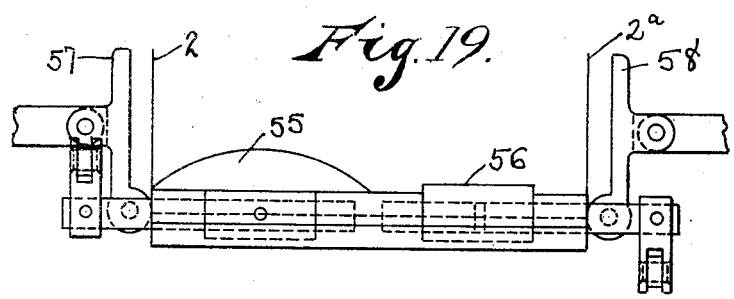
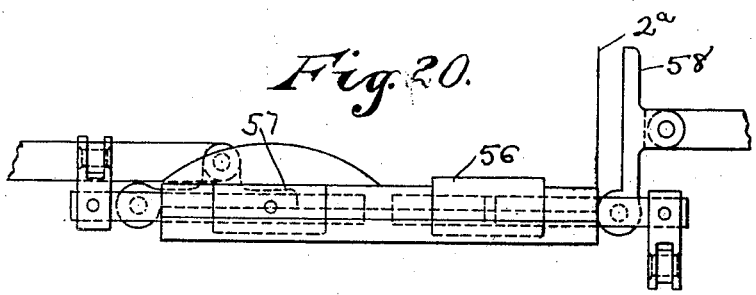

UNITED STATES PATENT OFFICE.

ABRAHAM NOVICK, OF BROOKLYN, NEW YORK, ASSIGNOR, BY MESNE ASSIGNMENTS, TO BRIGHT ENVELOPE COMPANY, A CORPORATION OF SOUTH DAKOTA.

ENVELOP-MACHINE.

1,039,786.  Specification of Letters Patent.  Patented Oct. 1, 1912.

Application filed January 25, 1911. Serial No. 604,012.

*To all whom it may concern:*

Be it known that I, ABRAHAM NOVICK, of Brooklyn, in the county of Kings, and in the State of New York, have invented certain new and useful Improvements in Envelop-Machines; and I do hereby declare that the following is a full, clear, and exact description thereof.

The object of this invention is to provide a machine for making envelops similar to that which forms the subject of Letters Patent No. 958,785 issued to Lewis C. Van Riper.

Figure 9:
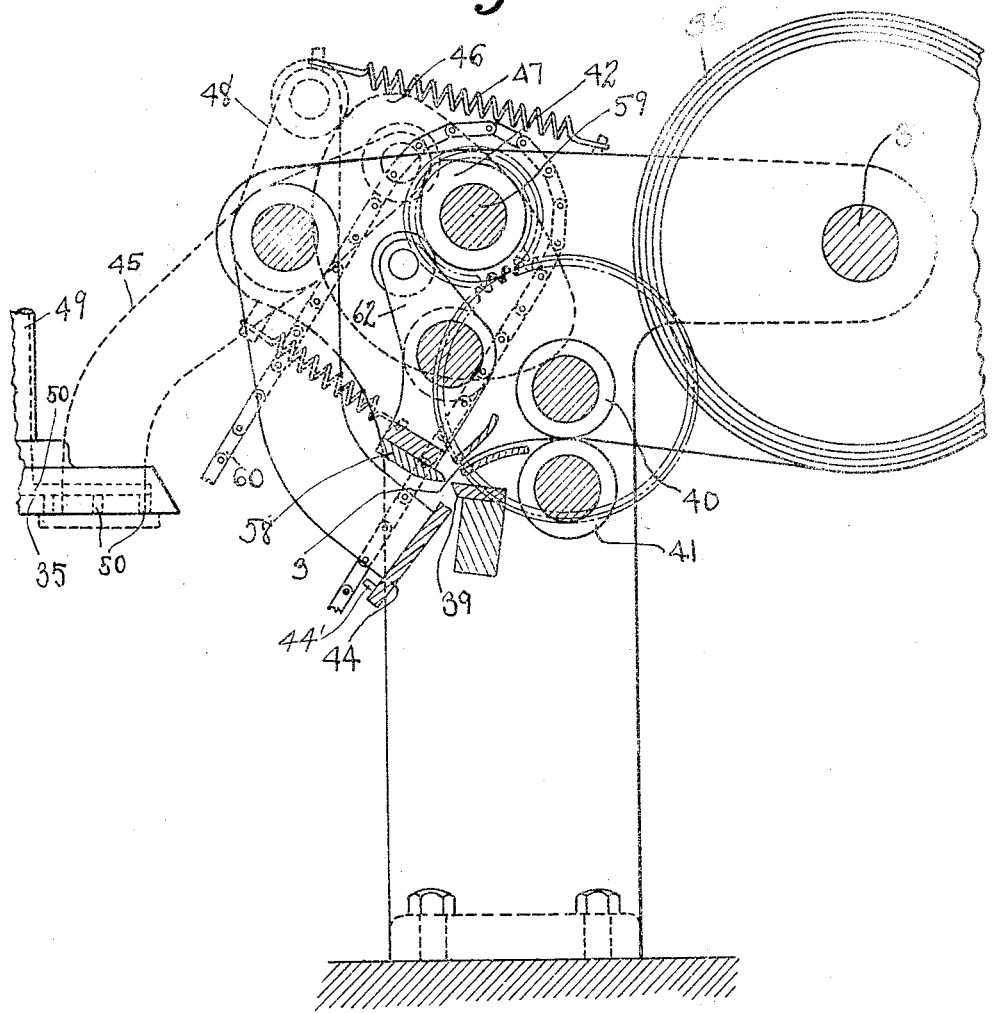
Figure 10:
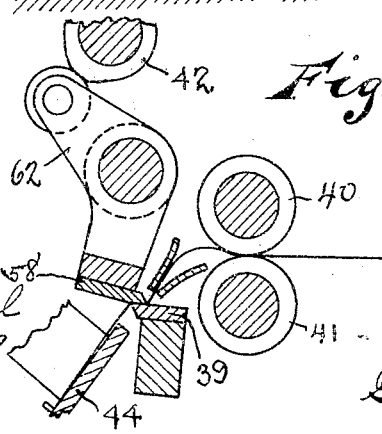

In the drawings Figures 1 to 7 inclusive are views illustrating the successive steps in making the envelops. Fig. 8 is a view showing the finished envelop partially in section. Figs. 9 and 10 are sectional views of the strip cutting and feeding mechanism. Figs. 11, 12, 13 and 14 show the means for folding over and sealing down the auxiliary flaps. Fig. 15 is a side view of the entire machine showing only such parts as will be necessary to make clear the following description. Figs. 16 and 17 are sectional detail views of the folding foundation, showing the slotted plunger in its lower and upper positions, respectively; and Figs. 18, 19 and 20, are detail views showing the folders in different positions, in the operation of folding an envelop.

Figure 1:
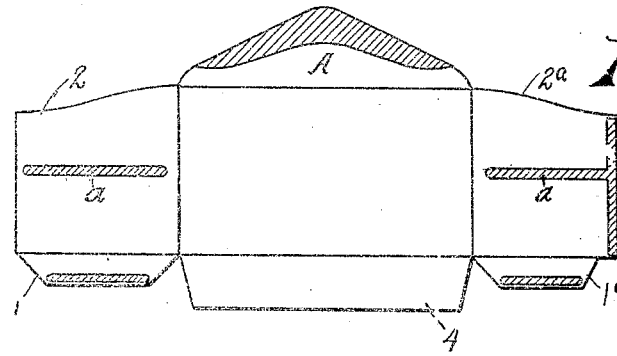
Figure 2:
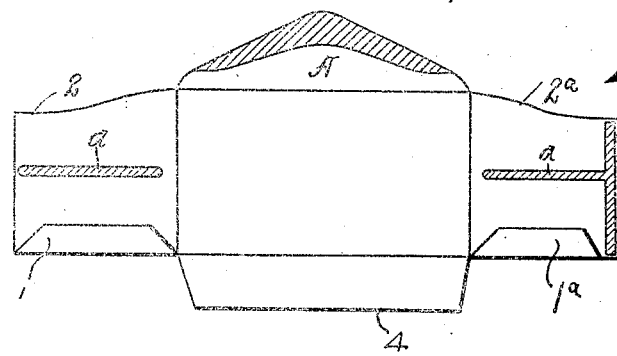
Figure 3:
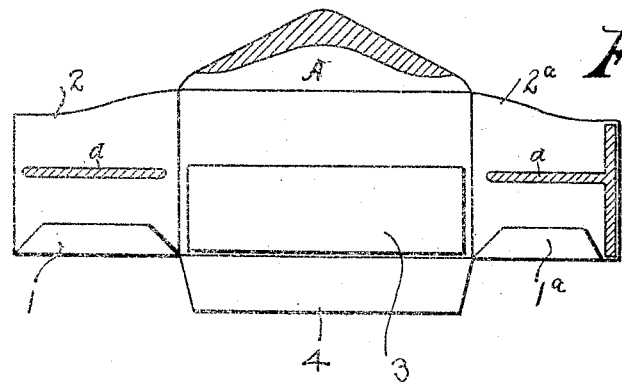

To form the envelop from the blank shown in Fig. 1, the auxiliary or hem flaps 1 and 1ª are folded over on and gummed to the side flaps 2 and 2ª respectively as shown in Figs. 2 and 8, then the strip of paper or guard 3 is placed in position as in Fig. 3, inspection flap 4 is then folded over as in Fig. 4, side flap 2 is folded over as in Fig. 5, side flap 2ª is folded over as in Fig. 6 and Fig. 7 shows the completed envelop.

Referring to Fig. 15, 5 is a stack of blanks resting on an elevator 6 from which they are lifted one at a time by the vertically reciprocating, gum coated pickers 7. A blank is dropped on the carrier 8, and the carrier 8 is then reciprocated horizontally by means of the levers 9 and 10 through link 11, the construction of which is also similar to that of an ordinary envelop machine. By means of this gum coated picker, the gum is applied to the usual sealing flap A, to the middle portion of the side flaps as at *a*, and to the hem flaps 1 and 1ª. The gummed blank 12 resting on the carrier is then carried to the hem flap folding mechanism 13 in which the flaps 1 and 1ª are folded as will be seen by referring to Fig. 11, in which the blank 12 is shown brought up against the stops 14, shaft 15 is then rotated slightly in the direction of the arrow 16 by means of a lever, connection, cam lever and cam, not shown, (similar to 17, 18, 19 and 20 of Fig. 15) until the presser foot 21, which is loose on shaft 15, holds the blank 12 from moving throughout the following operation. The continued oscillating of shaft 15 causes the spring 22 to collapse, as the creaser lever 23 is tight on the shaft 15, until the creasing blade 24 creases the auxiliary flaps 1 and 1ª as in Fig. 12. The stop 14 is then dropped and the folder 25 is moved to the position in Fig. 12 by rocking the shaft 26 in the direction of the arrow 27. The arm 28, fastened to shaft 30, rests against the stationary stud 29, and retains said shaft in a certain relation to the stud 29, and allows the shaft 30 to oscillate in the direction of the arrow 31, upon the downward movement of shaft 30 due to the rocking of shaft 26 which lowers the outer end of the arm 26′ and allows the mechanism, comprising the members 25, 28 and 30 to seek its center of gravity and assume the position shown in Fig. 12. The creaser blade 24 is then raised as in Fig. 13 and the folder 25 continues to advance in the direction of the arrow 32 of Fig. 13 until it reaches the position shown in Fig. 14 which completes the folding of the auxiliary flaps 1, 1ª and the flap 4. The folder 25 and the presser foot 21 are then raised off of the blank, and the carrier hooks 32′ then carry the blank to the creasing box 51 of a folding mechanism shown in Figs. 16 and 17; the carrier, in its operation, being well known to the art.

The strip of paper 3 is attached to the under side of the plunger 35 (see Figs. 15 and 9) by the mechanism shown in Fig. 9 as follows: 36 is a roll of paper mounted loosely on the spindle 37, this paper is fed across the cutters 58 and 39 by the feed rolls 40 and 41 and when a sufficient length has been fed across the cutters, the cam 42 which is fastened to the drive shaft 59, and driven by the chain 60 from the main shaft 61, see Fig. 15, acts on the cam lever 62 so as to sever the strip from the roll 36. The severed strip 3, which then rests on the carrier platform 44 and against the gage 44′ is carried to the under side of the plunger 35 (as shown in broken lines at 45 of Fig. 9) by means of the cam 46 spring 47 and cam lever 48. The plunger rod 49, which may be reciprocated in any well known and proper manner, and constitutes means for reciprocating the plunger, is hollow and a suction is applied therethrough from a suitable source, this suction reaches through the hollow plunger rod 49 and the holes 50 so that when the carrier platform returns to its normal position the strip of paper 3 remains attached to the under side of the plunger being held there by the suction. The plunger 35 is then brought down and pushes the blank 12 through the creasing box 51 in a manner that is well known to the art, (see Fig. 16) and just before the plunger 35 reaches the folding foundation 52 the retaining hooks 53 are brought forward and the plunger 35 and hooks 53 continue until they reach the position shown in Fig. 16. The retaining hooks 53 pass through the peripheral slots 54 of the plunger 35 and as the plunger 35 is returned to its normal position, the retaining hooks 53 remove the strip 3 from the bottom of the plunger 35 and hold it in position on the blank 12 until the back folders 55 and 56, fold down the inspection flap 4 over the strip 3 and the retaining hooks are then returned to their normal position. In Fig. 19 the folder 55 is raised to its normal position and in Fig. 20 the side folder 57 folds down the side flap 2, and the side flap 2ª is likewise folded down, and the envelop is then completed as in an ordinary envelop folding machine. The folders 55, 56, 57 and 58 are all operated as in an ordinary envelop folding machine.

What I claim, is:

1. In an envelop machine, means for holding an envelop blank, means for folding a hem flap and an inspection strip on said blank, and means for placing and securing a guard strip between the body of the envelop blank and said inspection strip.

2. In an envelop machine, means for holding an envelop blank, means for folding a hem flap and an inspection strip on said blank, and means for placing a guard strip between the body of said blank and said inspection strip, means for folding and securing side flaps on the said inspection strip and means for holding said guard strip stationary while the side flaps are being folded.

3. In an envelop machine, means for holding an envelop blank, means for folding a hem flap and an inspection strip on said blank, means for placing a guard strip between said inspection strip and body of the blank, and means for folding side flaps upon said guard strip and securing said side flaps to said guard strip.

4. In an envelop machine, means for holding an envelop blank, means for folding an inspection strip on said blank, means for placing a guard strip between the said inspection strip and the body of the blank, and means for folding side flaps upon said guard strip and securing said side flaps to said guard strip.

5. In an envelop machine, a folding foundation, a slotted plunger operatively related to the folding foundation for placing an envelop blank thereon, a hook shaped retaining member pivotally and operatively related to the folding foundation and adapted to enter the slot in the plunger for holding the blank on the foundation, and means for folding the envelop blank while being retained by said hook shaped member.

6. In an envelop machine, a creasing box, a plunger having a slot therein, means for delivering a strip of paper to the underside of the plunger, a folding foundation, means coöperating with the plunger for bringing said strip and said envelop blank together and for placing them upon the folding foundation, and an oscillatory retaining member in operative relation with the folding foundation and adapted to enter the slot of the plunger and to retain the strip and blank in fixed relation to the folding foundation, while the plunger is raised, and means for folding and securing the flaps upon the strip of paper while it is held by the retaining member.

7. In an envelop machine, a folding foundation, means for placing a strip of paper upon an envelop blank and for placing said envelop blank and strip upon the folding foundation, an oscillatory hook shaped member coöperating with the folding foundation for retaining said strip upon said blank, and means for folding and securing the flaps upon said strip while it is held on the blank by said retainer.

8. In an envelop machine, a folding foundation, a plunger having a slot therein, means for applying a strip of paper to the under side of said plunger and across said slot, means for placing an envelop blank under said strip, means for reciprocating the plunger and thereby placing the envelop blank and strip upon the folding foundation, a retaining member in operative relation for entering the slot of the plunger and retaining the strip and blank on the folding foundation, and means for folding and securing a flap of the blank on the strip while it is retained by the retaining member.

9. In an envelop machine, a folding foundation, folding mechanism coacting with the foundation, a peripherally slotted plunger for placing an envelop blank on the foundation, and means in operative relation to the plunger and foundation for entering the slot of the plunger and holding the blank on the foundation.

ABRAHAM NOVICK.

Witnesses:
 FRANCES SIEGEL,
 JOSEPH SANDERS.